United States Patent [19]
Leong

[11] 3,929,118
[45] Dec. 30, 1975

[54] I.C. ENGINE IMPROVEMENTS

[76] Inventor: Chai Mun Leong, 108 Serangoon Garden Way, Singapore 19, Malaysia

[22] Filed: June 11, 1973

[21] Appl. No.: 368,726

[30] Foreign Application Priority Data
June 13, 1972 United Kingdom............. 27617/72
Mar. 26, 1973 United Kingdom............. 18986/73

[52] U.S. Cl............ 123/198 A; 123/1 A; 123/119 D; 123/141 R; 123/119 A
[51] Int. Cl.².................. F02B 75/02; F02M 23/00
[58] Field of Search............ 123/198 A, 141 R, 1 A, 123/119 D

[56] References Cited
UNITED STATES PATENTS

| | | | |
|---|---|---|---|
| 1,287,282 | 12/1918 | Furness et al...................... | 123/1 A |
| 2,086,775 | 7/1937 | Lyons et al......................... | 123/1 A |
| 2,460,700 | 2/1949 | Lyons................................. | 123/1 A |
| 3,437,467 | 4/1969 | Jacobus.............................. | 123/141 |
| 3,450,116 | 6/1969 | Knight et al...................... | 123/198 A |

FOREIGN PATENTS OR APPLICATIONS

| | | | |
|---|---|---|---|
| 773,115 | 4/1957 | United Kingdom............. | 123/119 D |
| 942,055 | 11/1963 | United Kingdom............. | 123/198 A |
| 1,212,925 | 11/1970 | United Kingdom............. | 123/1 A |

OTHER PUBLICATIONS
Industrial and Engineering Chemistry Vol. 18, No. 9 pp. 985, 986 1926.

*Primary Examiner*—Wendell E. Burns
*Attorney, Agent, or Firm*—Larson, Taylor & Hinds

[57] ABSTRACT

I. C. Engine fuel utilisation is improved and noxious exhaust emissions are reduced by feeding extra, heated air to the inlet manifold in conjunction with a combustion catalyst, particularly a copper compound.

13 Claims, 4 Drawing Figures

I.C. ENGINE IMPROVEMENTS

The invention relates to the improvement of the internal combustion engine running on hydrocarbon fuels.

The object of the invention is to provide a means to reduce the noxious products of combustion in the exhaust gas and to increase the overall efficiency of the engine by improving the combustion of the fuel, thus reducing consumption.

It is known that, in present day motor car engines and other internal combustion engines, a good percentage of the fuel fed into the induction passages and combustion chamber is not fully burned. This is due partly to inefficient atomisation and vaporisation of the fuel before it enters the combustion chamber and partly to the mixture of air/fuel not being constant under different running conditions. On account of the heavy nature of the fuels and other limitations, complete vaporisation of the fuel is not achieved in present day carburettors.

The invention provides a method of improving fuel utilisation, and reducing noxious exhaust emissions, in an internal combustion engine having a carburettor for feeding a fuel/air mixture to an inlet manifold or other mixture inlet, said method comprising admitting one or more streams of heated air to the mixture inlet to impinge upon and mix with the flow of fuel/air mixture, and causing a combustion catalyst, particularly a copper compound, to pass into the mixture inlet, to be carried into the combustion chamber or chambers of the engine and thence into the exhaust system.

The invention provides further an internal combustion engine having a carburettor for feeding fuel/air mixture to the inlet manifold or other mixture inlet of the engine and an exhaust manifold or other exhaust system for burnt gases, in which engine the mixture inlet has one or more air inlet passages for admitting and directing a stream or streams of extra, heated air to impinge upon and mix with the fuel/air mixture from the carburettor, and in which engine furthermore, means are provided for causing a combustion catalyst to pass into the mixture inlet, alone or with the air or part of it, and thence into the combustion chamber or chambers of the engine and into the exhaust system.

The invention also provides a combined inlet/exhaust manifold, alone or associated with an exhaust-pipe heat exchanger, suitable for such an engine. The manifold or manifold and heat exchanger may be sold separately, for home or commercial installation on vehicle or other engines not fitted up as described herein from new.

Preferably a heat exchanger is provided to heat the extra air by means of heat in the exhaust gases. For example the heat exchanger is an air inlet tube passing through the interior of the exhaust system or alternatively or in addition wrapped round a pipe through which the exhaust gases pass.

Suitably the or each air inlet passage is provided with a non-return valve set to admit air at a predetermined inlet depression below atmospheric pressure.

In one construction according to the invention the or one of the air inlet passages is disposed to direct an air stream into the mixture outlet from the carburettor or from each carburettor in a twin or multiple carburettor engine. Alternatively or in addition the or one of the air inlet passages is disposed to direct an air stream into the mixture at the or each position at which fuel/air mixture passes to a combustion chamber of the engine.

Suitably in this construction the air streams are directed by a common air inlet tube disposed within a manifold and having a hole facing the or each combustion chamber.

In an alternative construction to the above the air inlet passages are supplemented or replaced by passages for recirculated, heated exhaust gases to be fed either alone or mixed with air, said passages being arranged in the manner set out above for air inlet passages.

For feeding the catalyst the installations preferably have means for feeding the catalyst in solution into the fuel/air mixture, the solution being fed as such or through a heat exchanger converting the solution to steam, carrying catalyst particles, and being fed alone or mixed with extra air or recirculated exhaust gases. Catalyst admission need not be continuous.

According to the invention therefore, heated air or exhaust gas, with a combustion catalyst, is introduced into the induction passages of the engine. This gives rise to physical and chemical actions producing certain desired effects discussed further below. The air, for example drawn in by the depression present in the inlet manifold, may be in one or more streams, and clashes with considerable force, on entering the induction passages, with the air/fuel mixture coming from the carburettor. The resulting turbulence causes breaking up of the fuel into finer droplets thus improving on the process of atomisation set up originally by the carburettor. The heat, acquired for example by passage of the air through tubing passing through the exhaust manifold, accelerates the vaporisation process so that, by the time the fuel enters the combustion chamber, it is in such a vaporised stage that it is easily ignited and burns more fully. The introduction of 'extra', heated air ensures that sufficient oxygen is present at all times for efficient combustion to take place.

It is thought further that the introduction of minute quantities of ammonia in the stream of air, will reduce the nitrogen oxide to nitrogen and water.

It is postulated further that catalytic action plays an important role in improving the combustion process. In particular copper, as such or as a compound, acts as a catalyst when petrol is burnt in its presence and causes acceleration of the combustion process resulting in a more complete burning of the fuel. Thus it is found that compounds of copper such as copper sulphate, cuprous chloride, cuprous nitrate and cuprous hydroxide and possibly others can be employed to act as catalysts to promote better and more efficient combustion.

Dilute copper sulphate solution, on being subjected to sufficient high temperatures, is converted to oxides of copper. The addition of a little ammonia, which itself may assist in production of a cleaner exhaust, results in the formation of cupric hydroxide, which is also reduced to cupric oxide by heat. Copper oxides, thus formed, are then carried by the current of air and deposited in the combustion chamber, and the exhaust passages to act as catalysts. They may also be deposited in the induction passages if the temperature is high enough.

Cuprous chloride dissolves readily in ammonia to form a complex. This ammoniacal solution, when introduced into the induction passages and combustion chamber, not only causes the effect mentioned, but also absorbs monoxide as shown below:

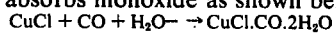

Cuprous nitrate is easily decomposed by heat to become cupric oxide, nitrogen dioxide and oxygen.

Cupric hydroxide and cuprous hydroxide are converted to oxides of copper by heat.

Another fact is that, copper, if heated in dry air, oxidises superficially, giving a mixture of cuprous and cupric oxide. In a subsidiary feature of the invention, a current of air, drawn in by depression in the inlet manifold, passes along copper tubing, which is heated by the exhaust gases. This current of dry air, passing over the heated copper tubing, causes the formation of a mixture of cuprous and cupric oxides superficially. If the temperature is sufficiently high, some particles of these compounds thus formed are detached by the agitation and are carried away by the current of air to be deposited along the induction passages, the combustion chamber and even along the exhaust passages to set up their catalytic effect under suitable conditions. The resultant reaction, not only accelerates the combustion process in the combustion chamber but also helps to complete the combustion of any unburnt fuel in the exhaust passages.

Thus, with better atomisation, vaporisation, sufficient oxygen and the chemical action provided, the result is improved combustion and lowering or elimation of the noxious products of combustion besides improvement in petrol consumption.

Embodiments of the invention are described by way of example only with reference to the accompanying drawings in which.

Figure 1:
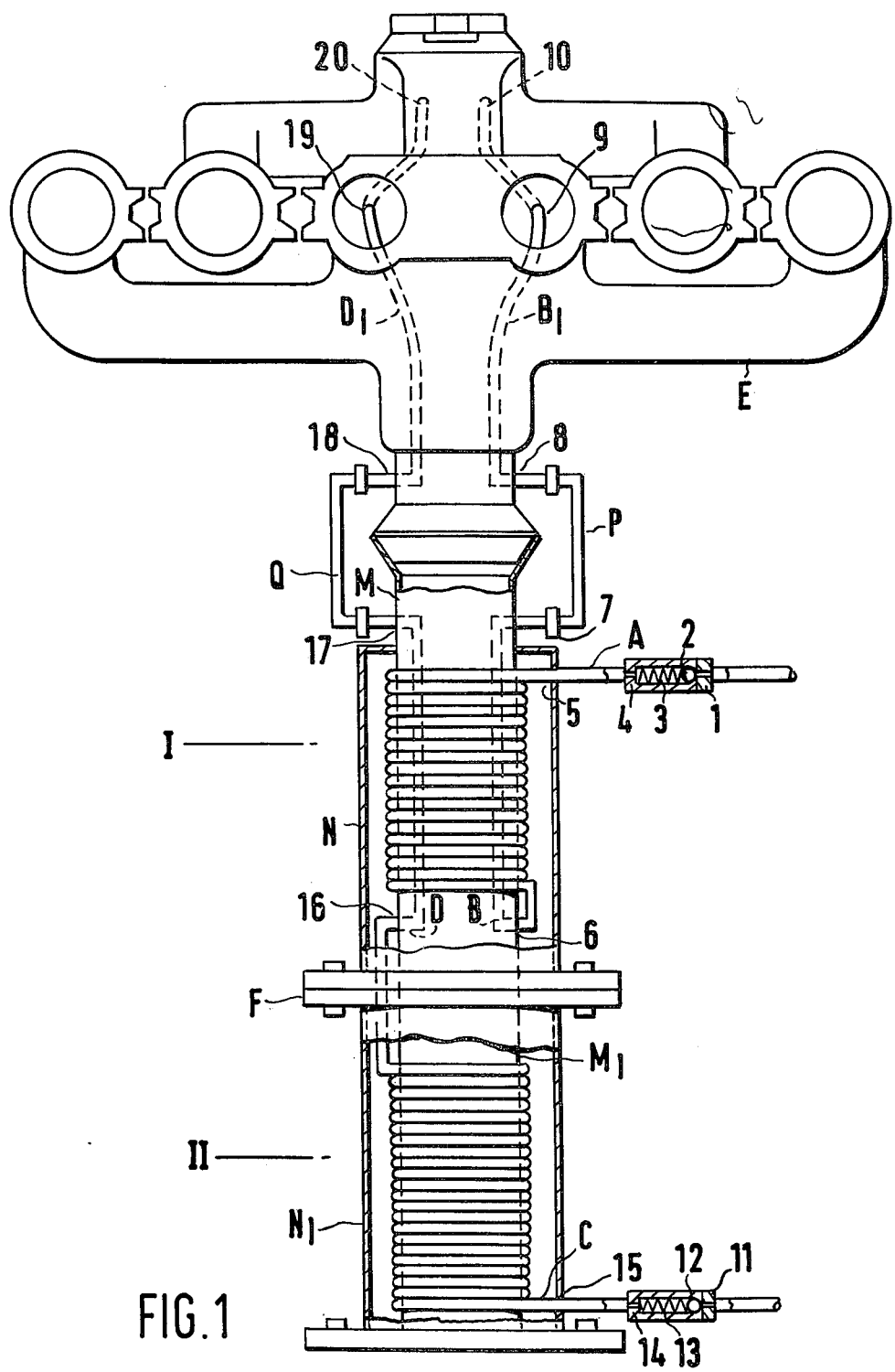
FIG. 1 is a perspective view of the inlet and exhaust manifold of an internal combustion engine of a motor car, seen from the engine side.

Referring to the FIG. 1, it is seen that modifications are carried out on the inlet and exhaust manifold. The device comprises two sections I an II. Section I consists of an inner tube M made of metal, copper or cast iron. It is joined to the outlet of the exhaust manifold by a clamp, or may be formed as an extension of the manifold. This tube M is encircled by an outer layer or tube N made of cast iron or any metal. This section is 5 to 6 inches in length and the diameter 2½ – 3½ inches or thereabouts.

Section II is of the same dimensions and joined to Section I by flange F at one end. At the other end it is joined to the exhaust pipe of the car engine also by a flange, screwed on tight to prevent leakage.

At section I, an opening is made at the outer tube or casing at 5 through which a copper pipe A passes. This copper pipe A is wound round the inner tube M until at point 6 it passes inside tube M through a hole made in the side of the tube and joins another copper tubing B. This tubing is led upwards through tube M of the Section I to join a connecting pipe P at 7. The pipe then enters the exhaust manifold E at point 8 to join tubing B1 which is made of copper. The tubing B1 then passes into a branch of the exhaust manifold E, through the "hot spot" or "heat exchanger" at 9 (where the walls of the inlet and exhaust manifold meet and form a common wall). The tube ends at orifice 10, situated just below the flange on which the carburettor is mounted.

The other end of the tube A is attached to a small metering device, a cylinder made of copper or steel with a centre passage with openings at 1 and 4 and a ball valve 2 and a spring 3. The size of the openings 1 and 4 is 0.5mm or thereabouts but can vary from 0.2mm to 1mm by adjustments. The opening 1 of the metering device is attached to a flexible tubing of plastic or other inert materials of small size, which leads to a plastic container (not shown) with a controlling valve which can be shut off completely, if required. The catalyst chemicals, for example a few grams of cuprous chloride in a gallon of ammoniacal water, are placed in the container and the flow is controlled and adjusted by turning a small lever or knob. One container full may for example last a week (1 or 2 pints). The liquid then passes through the metering device which further regulates the amount of flow by its small opening. An adjusting device can be fitted to vary the size of the opening or to close it completely.

In an alternative construction, the metering device to section I is fed by a pipe passing right along the exhaust manifold first.

Section II shows a similar arrangement. The metering device, however, is not attached to any tubing. Instead of a fluid containing chemicals, air enters the metering device. The size of the aperture 11 is 0.5mm. The air then passes through the ball valve arrangement 12 and 13 then another aperture 14 to join tube C made of copper or other metal, provided it is a good conductor of heat. It travels along tubing C which penetrates into the outer tube N1 at point 15 and is wound round the inner tube M1. The air is then led by the tubing C through the flange into Section I where it enters the inner tube M of the Section at 16 to join tubing D. Tubing D is made of copper or any good heat conducting metal or alloy. This tubing then conducts the air through the inner tube M, energing at 17 to join a connecting tubing Q, which connects tubing D to D1, which is also made of copper. It then proceeds along tubing D1 into the exhaust manifold E at 18 and finally penetrates into the induction passage by passing through an opening made at the hot spot at 19. The tubing ends in an orifice 20 situated just below the flange on which the carburettor is mounted.

In a variation, a double layered or double tubed exhaust manifold with a space between the outer layer or tube and the inner layer or inner tube is used. Plates made of copper are wound round the periphery in a corkscrew fashion and fixed between the two layers form a passage for the air or chemical fluids. The two passages, one on each side, thus formed can be joined to the metering device to piping or tubing A or C (as in FIG. 1) by connecting tubings similar to P and Q of FIG. 1. As before, copper piping placed between the layers can be employed to conduct the air and fluid.

In addition, an injecting device, similar to the fuel injector of a diesel or compression ignition engine or fuel injection device from other internal combustion engines can be introduced at suitable points in the exhaust passages injecting a minute quantity of ammonia or chemicals required to reduce or eliminate the noxious product of combustion.

Figure 2:
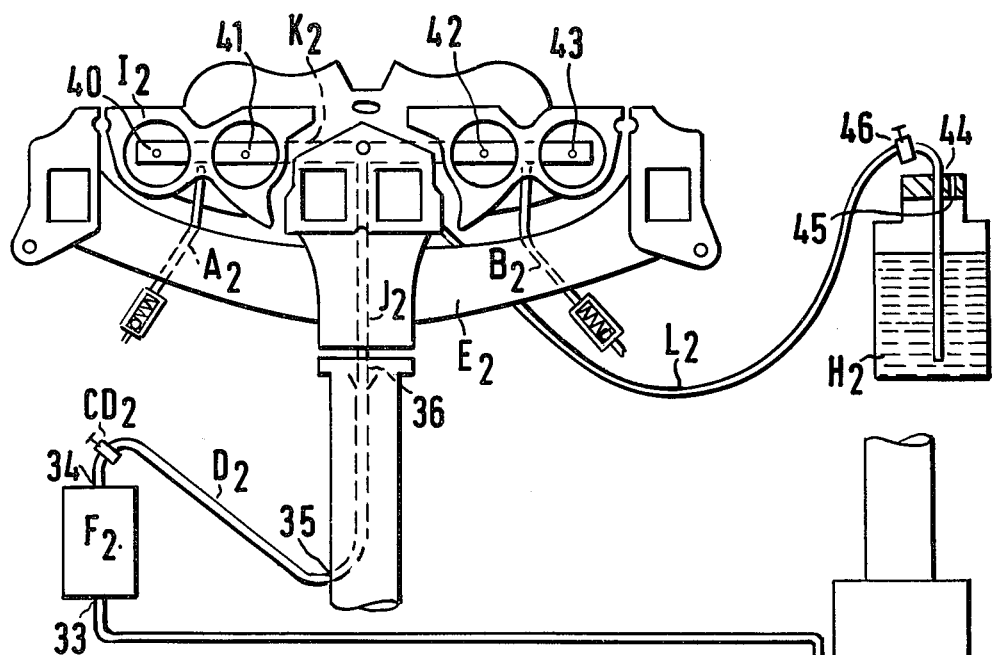
FIG. 2 is a similar view of a further manifold with associated equipment diagrammatically indicated.
Figure 3:
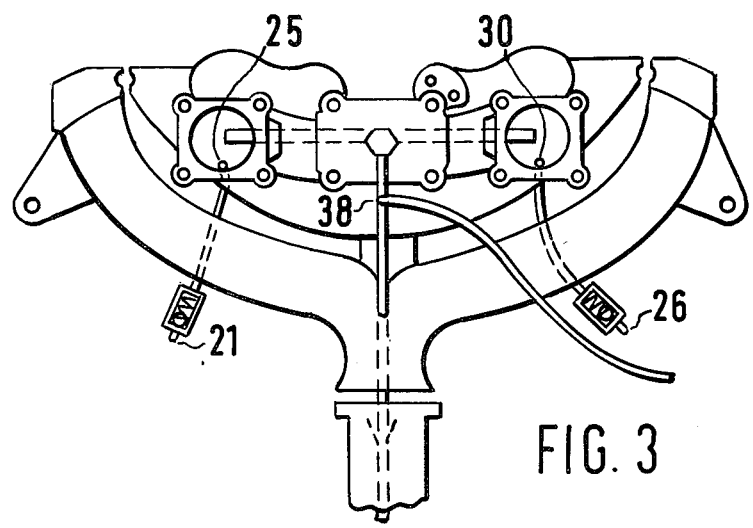
FIG. 3 is a view of the manifold of FIG. 2 from the carburettor side.

Referring to FIGS. 2 and 3, it is seen that modifications are again carried out on the inlet and exhaust manifold and also the exhaust pipe. The manifold used is that of Volvo 144S fitted with twin carburettors. According to the arrangement two tubes $A_2$ and $B_2$, made of copper or any suitable metal pass one through each arm of the exhaust manifold $E_2$ to take up heat and end in apertures 25 and 30 just below the flanges on which the carburettors are mounted. The other ends of tubes $A_2$ and $B_2$ are attached to metering devices, the openings 21 and 26 of which measure about 0.3mm and can vary from 0.2mm to 1mm. by adjustments. They admit air in streams and assist fuel atomisation as already described, and its vaporisation.

Another steel or iron tube $C_2$ begins near the tail end of the exhaust E with the openings at 31. It is then led out through an opening at 32 and then skirts round the silencer $S_2$ and proceeds by the side of the exhaust pipe beneath the car. Near the engine end the tubing, which can now be made of flexible, heat resisting material is let into a filter $F_2$ through opening 33.

Another pipe or tubing D is attached to the outlet of the filter at an opening 34. A controlling device $CD_2$ is situated near the outlet. This tubing $D_2$ then enters the exhaust pipe near the exhaust manifold at point 35 and proceeds upwards to join another pipe $J_2$ at point 36. This pipe or tube $J_2$, made of steel, iron or any strong heat resisting metal proceeds upwards through the centre of the manifold and joins a metal tube or hollow bar $K_2$ made of copper, steel or other heat resisting metal. Tube $K_2$ is placed transversely across the inside of the inlet manifold $I_2$. This metal tube or hollow bar is closed at both ends but with four small openings measuring about 1mm to 2mm in diameter as at points 40, 41, 42, 43. Each opening faces the centre of the inlet manifold openings facing the inlet passage openings of the engine.

From the bottle $H_2$, containing chemicals, a tube is led out through an opening 44 to a controlling device at point 46. Another small opening to allow air to flow in is at point 45. From the controlling device, a tube $L_2$ is led directly to the centre of the inlet manifold. It then penetrates the inlet manifold to join tubing $J_2$ at point 38.

Minute quantities of the chemical solution in container $H_2$ are sucked in by manifold depression into the manifold. The chemical then passes into tube $K_2$, dispersed, and is drawn into the combustion chambers through apertures 40, 41, 42, 43 to exert chemical action before, during and possibly after the combustion process as considered earlier.

Figure 4:
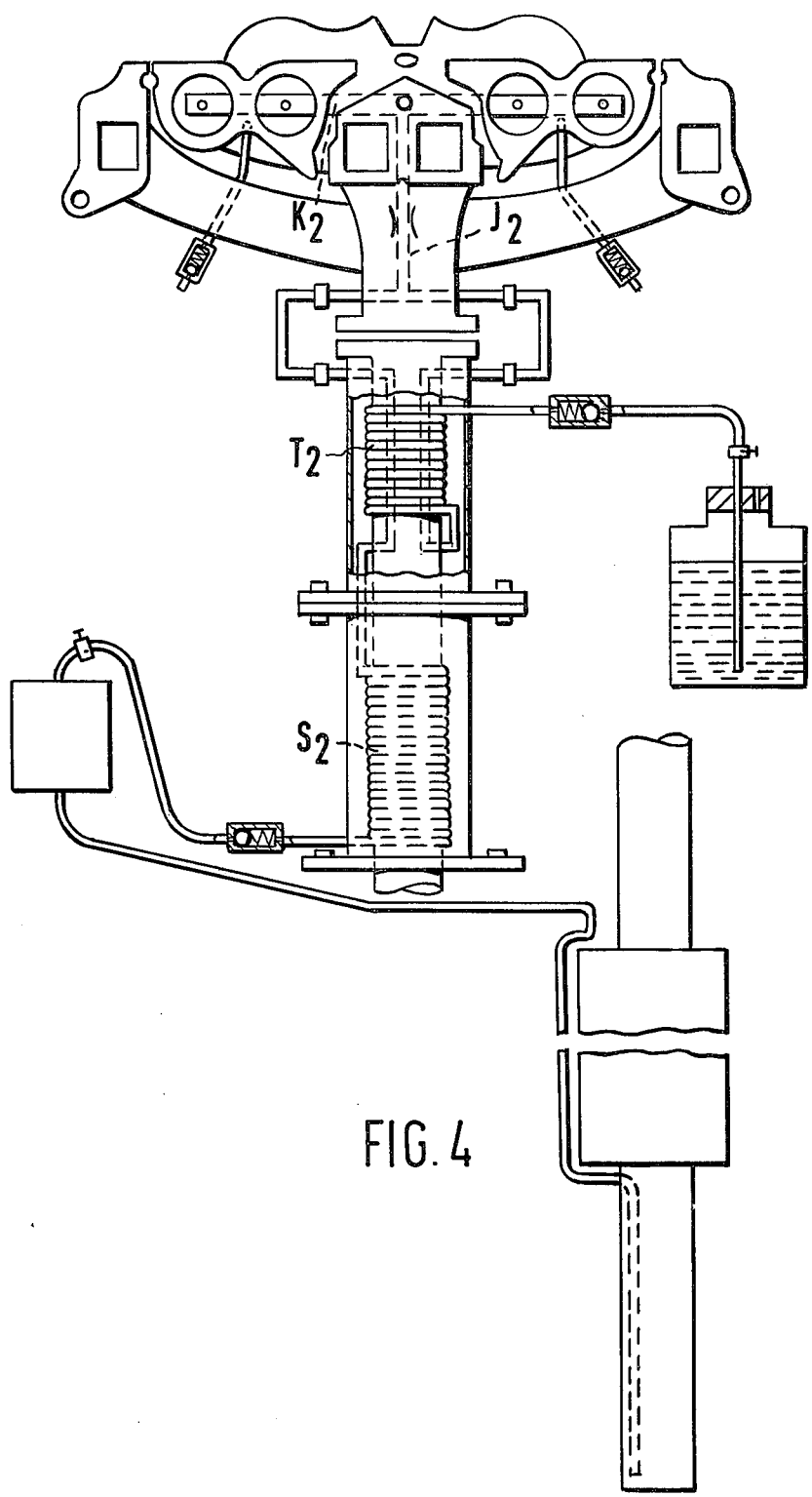
FIG. 4 is a view of a third manifold and associated equipment.

Alternatively, tube $L_2$ can be attached to the device at the exhaust pipe as shown in FIG. 4 where the chemical solution is heated up an vaporised before being conducted into tube $K_2$ and from there enters into the various combustion chambers. The temperature is also of some importance. The recirculated exhaust gases coming from filter $F_2$ can be similarly treated.

With respect to the carburettors, a slight modification is necessary, because of the improvement in the combustion process and the requirement for less fuel. To do this, the size of the needle is altered to limit or cut down the fuel coming through the jet opening in the case of SU carburettors.

Alternatively, the jet opening can be modified to give the same result. In the case of other down-draught carburettors, and other types e.g. Solex, Zenith, Stromberg, Weber, all that is required is to have a smaller jet opening.

As an addition to the above another controlling device may be constructed. An extra air inlet may open into the top of the inlet manifold, the size of the aperture again being adjustable. A solenoid valve can be attached at this spot to regulate and control the amount of air required under various engine speeds and running conditions.

In FIG. 4 provision similar to that in FIG. 1 is made. The main difference is that the arrangement allows both the exhaust gases or air and chemicals to be preheated to desired temperatures before entering the combustion chambers.

The cuprous chloride and ammoniacal solution in the container is sucked up by manifold depression. The controlling device regulates the flow and allows the minute amount required to pass through to pass into tube $J_2$ after having been heated by passage through tube $T_2$ wound round the exhaust pipe and so enter the combustion chamber in a vaporised state.

The exhaust gas which is sucked in, passes through to the filter and then through a wound tube $S_2$ before it proceeds along to join tube $J_2$ and finally enter the combustion chamber after passage through tube $K_2$.

I claim:

1. A method of improving fuel utilization, and reducing noxious exhaust emissions, in an internal combustion engine having a carburettor for feeding a fuel/air mixture to a mixture inlet, said method comprising admitting and directing at least one stream of heated air to the mixture inlet to impinge upon and mix turbulently with the flow of fuel/air mixture to vaporize fuel droplets therein, and causing a solution of a copper-salt combustion catalyst to pass in preheated and vaporized form into the mixture inlet, to be carried into the combustion chamber or chambers of the engine and thence into the exhaust system.

2. A method according to claim 1, in which ammonia is introduced with the catalyst in the form of a preheated and vaporized ammoniacal cuprous salt solution.

3. The method as claimed in claim 1 in which said solution of a copper-salt combustion catalyst is passed in heat exchanging relationship with the engine exhaust system to preheat and vaporize the solution prior to passage into said mixture inlet.

4. The method as claimed in claim 3 wherein said solution comprises a copper-salt in ammoniacal water.

5. An internal combustion engine having a carburettor for feeding fuel/air mixture to a mixture inlet and an exhaust system for burnt gases, in which engine the mixture inlet has at least one air inlet passage for admitting and directing a corresponding number of streams of extra, heated air to impinge upon and mix turbulently with the fuel/air mixture from the carburettor and vaporize fuel droplets therein, and in which engine furthermore, means are provided for causing a solution of a copper-salt combustion catalyst to pass in preheated and vaporized form into the mixture inlet and thence into the combustion chamber or chambers of the engine and into the exhaust system.

6. An engine according to claim 5, in which a heat exchanger is provided to heat the extra air by means of heat in the exhaust gases.

7. An engine according to claim 6, in which the heat exchanger is an air inlet tube passing in heat-exchanging relationship with the exhaust system.

8. An engine according to claim 5, in which the or each air inlet passage is provided with a non-return valve set to admit air at a predetermined inlet depression below atmospheric pressure.

9. An engine according to claim 5, in which at least one air inlet passage is disposed to direct an air stream into the mixture outlet from the carburettor.

10. An engine according to claim 5, in which the or one of the air inlet passages is disposed to direct an air stream into the mixture at the or each position at which fuel/air mixture passes to a combustion chamber of the engine.

11. An engine according to claim 10, being a twin or multi cylinder engine, in which the said air streams are directed by a common air inlet tube disposed within a manifold and having a hole facing the or each combustion chamber.

12. Apparatus as claimed in claim 5 including means for passing said solution of a copper-salt combustion catalyst in heat exchanging relationship with the engine exhaust system to preheat and vaporize the solution prior to passage into said mixture inlet.

13. Apparatus as claimed in claim 12 wherein said last mentioned means includes a tubular member passing through the exhaust manifold of the engine and thence into the intake manifold.

* * * * *